United States Patent
Park et al.

(10) Patent No.: US 11,669,491 B2
(45) Date of Patent: Jun. 6, 2023

(54) PROCESSOR, SYSTEM ON CHIP INCLUDING HETEROGENEOUS CORE, AND OPERATING METHODS THEREOF FOR OPTIMIZING HOT FUNCTIONS FOR EXECUTION ON EACH CORE OF A HETEROGENEOUS PROCESSOR

(71) Applicant: Samsung Electronics Co., Ltd., Suwon-si (KR)

(72) Inventors: Junmo Park, Hwaseong-si (KR); Dongsuk Jeon, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 78 days.

(21) Appl. No.: 17/224,628

(22) Filed: Apr. 7, 2021

(65) Prior Publication Data

US 2021/0318984 A1 Oct. 14, 2021

(30) Foreign Application Priority Data

Apr. 9, 2020 (KR) .................. 10-2020-0043608
Nov. 27, 2020 (KR) .................. 10-2020-0163052

(51) Int. Cl.
*G06F 15/78* (2006.01)
*G06F 15/82* (2006.01)

(52) U.S. Cl.
CPC .......... *G06F 15/82* (2013.01); *G06F 15/7807* (2013.01)

(58) Field of Classification Search
CPC .... G06F 8/443; G06F 9/4881; G06F 15/7807; G06F 15/82
See application file for complete search history.

(56) References Cited

U.S. PATENT DOCUMENTS

| | | |
|---|---|---|
| 8,561,037 B2 | 10/2013 | Wallach et al. |
| 8,578,355 B1 * | 11/2013 | Mars .................. G06F 8/443 717/153 |
| 8,635,606 B2 | 1/2014 | Kruglick |
| 9,195,443 B2 | 11/2015 | Kuesel et al. |
| 10,528,349 B2 | 1/2020 | Kumar et al. |
| 10,565,019 B2 | 2/2020 | Levin et al. |

(Continued)

OTHER PUBLICATIONS

Park, Junmo et al. "Microarchitecture-Aware Code Generation for Deep Learning on Single-ISA Heterogeneous Multi-Core Mobile Processors." IEEE Access, vol. 7 (2019): pp. 52371-52378.

*Primary Examiner* — Jacob Petranek
(74) *Attorney, Agent, or Firm* — Harness, Dickey & Pierce, P.L.C.

(57) ABSTRACT

Provided is an operation method of a processor including a plurality of heterogeneous cores, the operation method including selecting an execution core of the plurality of heterogeneous cores for executing an application, loading, from a memory, first data corresponding to core information of the execution core during runtime of the execution core, wherein the first data is included in compile data, the compile data including a first function compiled for each heterogeneous core of the plurality of heterogeneous cores, the first function being a function from among a plurality of functions of the application that is at least one of frequently called or having a long execution time, and processing, by the execution core, execution codes for executing the application, based on the first data.

20 Claims, 13 Drawing Sheets

(56) References Cited

U.S. PATENT DOCUMENTS

| | | | |
|---|---|---|---|
| 2005/0155026 A1* | 7/2005 | DeWitt | G06F 8/443 |
| | | | 717/158 |
| 2011/0320766 A1* | 12/2011 | Wu | G06F 9/30076 |
| | | | 712/28 |
| 2012/0233477 A1* | 9/2012 | Wu | G06F 9/445 |
| | | | 713/320 |
| 2014/0195788 A1* | 7/2014 | Kalogeropulos | G06F 8/4442 |
| | | | 712/237 |
| 2017/0123775 A1 | 5/2017 | Xu et al. | |
| 2019/0317880 A1 | 10/2019 | Herr et al. | |

\* cited by examiner

[FIG. 1]
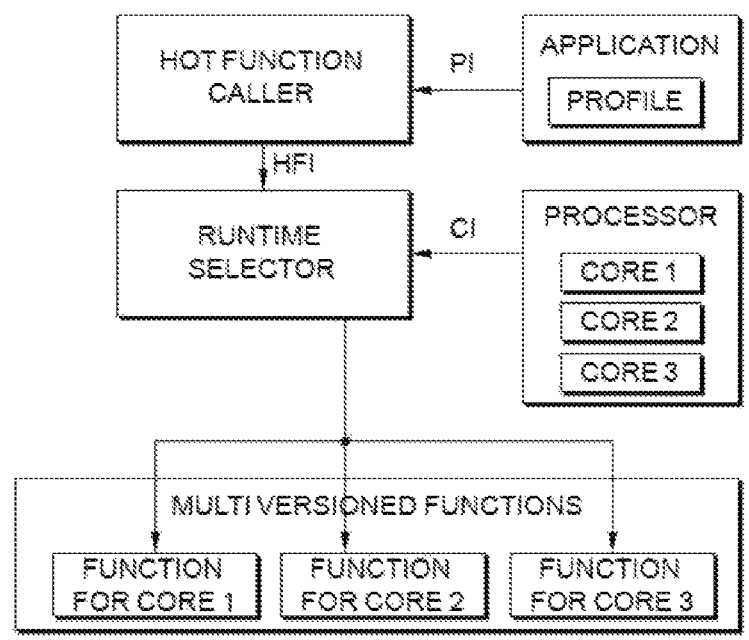

[FIG. 2]
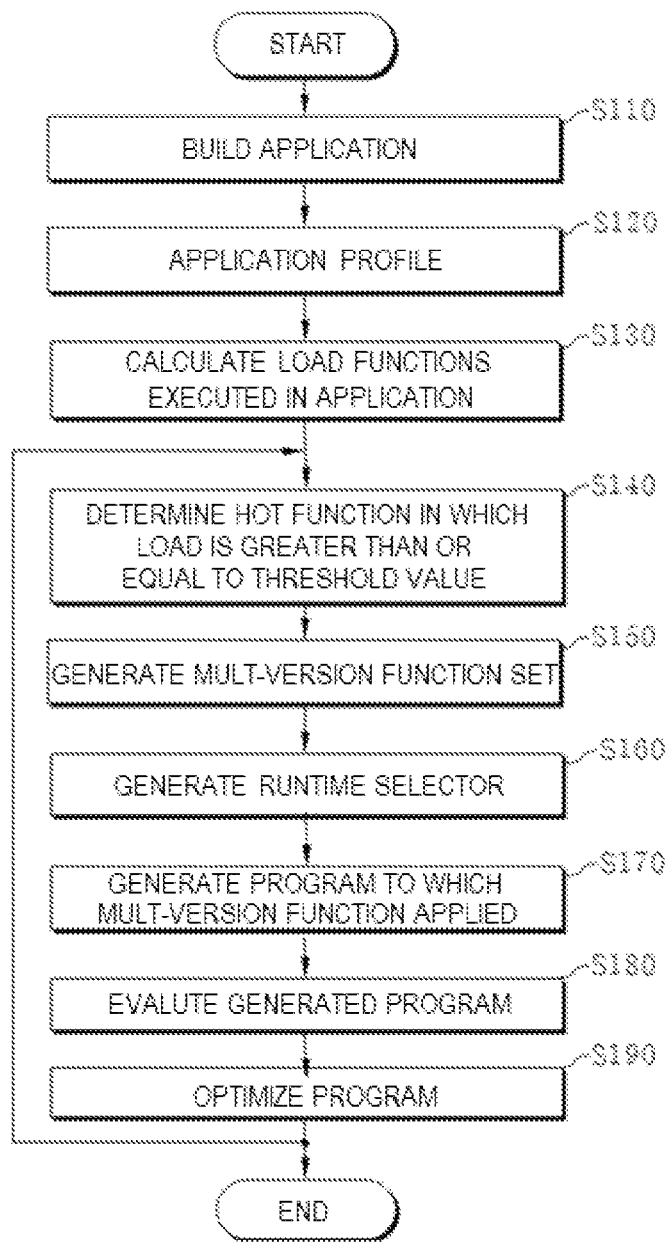

[FIG. 3]
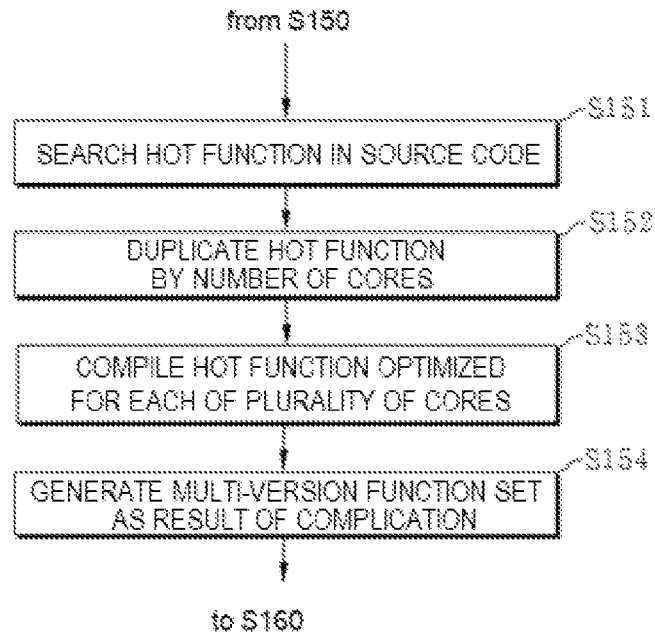
[FIG. 4]
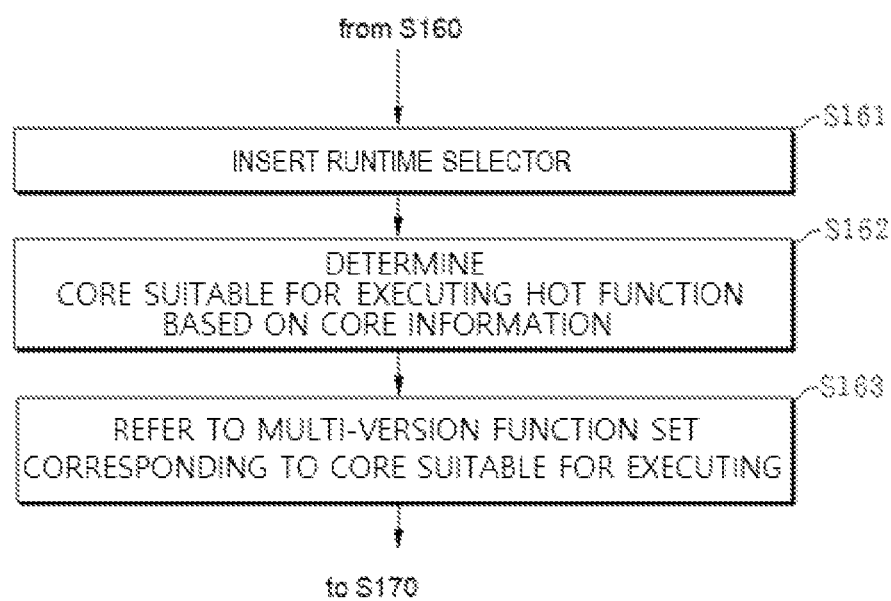

[FIG. 5]
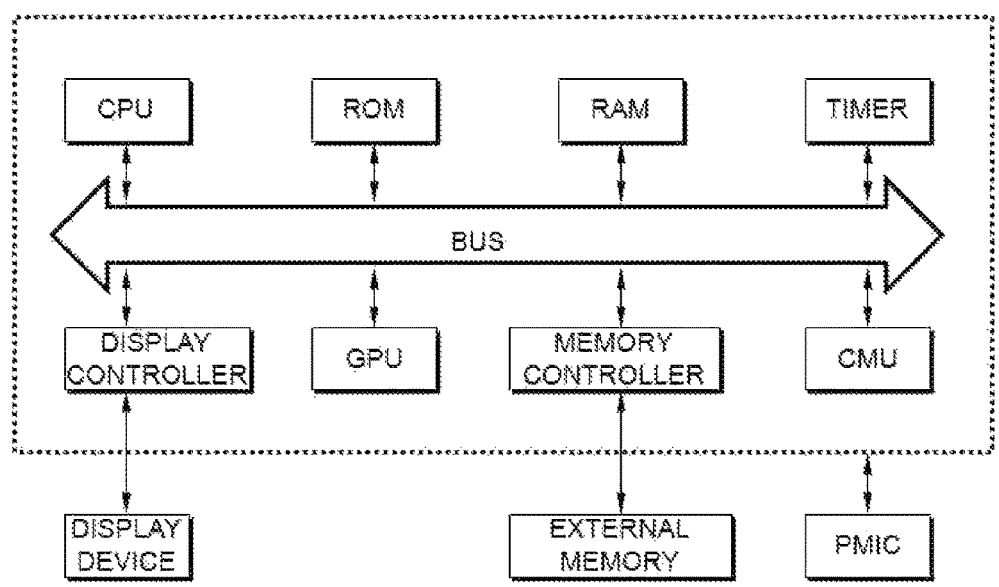
[FIG. 6]
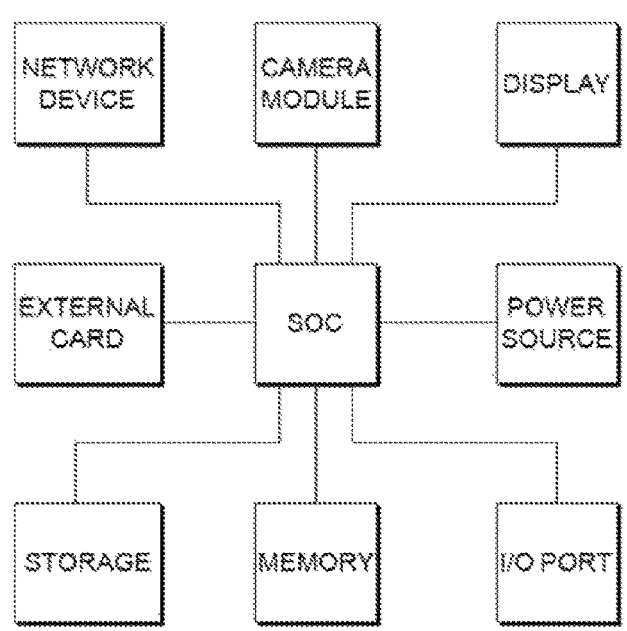

FIG. 12

```
1.   function  runtime_selector()
2.       pmu ← get_pmu_register()
3.       imp ← get_implementor_from_pmu_register(pmu)
4.       idcode ← get_idcode_from_pmu_register(pmu)
5.       case imp of
6.           ARM:
7.               case idcode of
8.                   Cortex-A55:
9.                       function_for_cortex-a55()
10.                  Cortex-A75:
11.                      function_for_cortex-a75()
12.              end case
13.          SAMSUNG:
14.              case idcode of
15.                  Exynos-M2:
16.                      function_for_exynos-m2()
17.                  Exynos-M3:
18.                      function_for_exynos-m3()
19.              end case
20.          Default:
21.              function_for_generic()
22.      end case
```

FIG. 13

```
1.  _attribute_((target("arch=cortex-a55")))
2.  function  fuction_for_cortex-a55( )
3.  _attribute_((target("arch=exynos-m2")))
4.  function  fuction_for_exynos-m2( )
```

PROCESSOR, SYSTEM ON CHIP INCLUDING HETEROGENEOUS CORE, AND OPERATING METHODS THEREOF FOR OPTIMIZING HOT FUNCTIONS FOR EXECUTION ON EACH CORE OF A HETEROGENEOUS PROCESSOR

CROSS-REFERENCE TO RELATED APPLICATIONS

This application is based on and claims priority under 35 U.S.C. § 119 to Korean Patent Application No. 10-2020-0043608, filed on Apr. 9, 2020, and 10-2020-0163052, filed on Nov. 27, 2020, in the Korean Intellectual Property Office, the disclosures of which are incorporated by reference herein in their entireties.

BACKGROUND

The inventive concepts relate to a processor, and more particularly, to a processor including a heterogeneous core for executing an application, a System on Chip (SoC), and operation methods of the processor and the SoC.

According to the demand for improving the computing performance, a processor tends to include two or more heterogeneous cores. A multi-core processor including two or more heterogeneous cores has a fast processing speed and consumes a small amount of power.

For effective improvement of throughput, a heterogeneous core, in which a high-performance core and a low-power core are embodied in one chip, is used. Although the high-performance core and the low-power core have different features, the high-performance core and the low-power core may be commonly used in a processor because of an instruction set architecture.

SUMMARY

The inventive concepts provide a processor for executing functions improved or optimized respectively for cores having different features, an operation method of the processor, and a System on Chip (SoC) including the processor, and operation method of the SoC.

According to an example embodiment of the inventive concepts, there is provided an operation method of a processor including a plurality of heterogeneous cores, the method including selecting an execution core of the plurality of heterogeneous cores for executing an application, loading, from a memory, first data corresponding to core information of the execution core during runtime of the execution core, wherein the first data is included in compile data, the compile data including a first function compiled for each heterogeneous core of the plurality of heterogeneous cores, the first function being a function from among a plurality of functions of the application that is at least one of frequently called or having a long execution time, and processing, by the execution core, execution codes for executing the application, based on the first data.

According to an example embodiment of the inventive concepts, there is provided an operation method of a System on Chip (SoC) including a memory and a processor including a plurality of heterogeneous cores and configured to process an execution code executing an application, the operation method including profiling the execution code, extracting a first function that is frequently called or has a long execution duration, based on the profiling, receiving compile data including the first function compiled based on each heterogeneous core of the plurality of heterogeneous cores, respectively, storing the compile data in the memory, and executing the application by processing a modified execution code including a caller referring to each heterogeneous core in the compile data.

According to an example embodiment of the inventive concepts, there is provided a System on Chip (SoC) in which an application is executed on a plurality of heterogeneous cores, the SoC including a processor including the plurality of heterogeneous cores, and a memory configured to store a plurality of functions forming the application, and compile data based on each heterogeneous core of the plurality of heterogeneous cores, wherein the processor is configured to load, from the compile data, first data corresponding to a first function based on core information of the plurality of heterogeneous cores, the first function having a profile load greater than a threshold value according to a profiling result.

BRIEF DESCRIPTION OF THE DRAWINGS

Some example embodiments of the inventive concepts will be more clearly understood from the following detailed description taken in conjunction with the accompanying drawings in which:

FIG. 1 is a block diagram of a computing system according to an example embodiment;

FIG. 2 is a block diagram of a system on chip according to an example embodiment;

FIG. 3 is a block diagram of a system on chip according to an example embodiment;

FIG. 4 is a flowchart of an operation method of a processor, according to an example embodiment;

FIG. 5 is a flowchart of an operation method of a processor, according to an example embodiment;

FIG. 6 is a flowchart of an operation method of a processor, according to an example embodiment;

FIG. 12 illustrates an example of pseudo code inserted into a function forming an application, according to an example embodiment;

FIG. 13 illustrates an example of pseudo code regarding compile data stored in a memory, according to an example embodiment;

DETAILED DESCRIPTION

Figure 7:
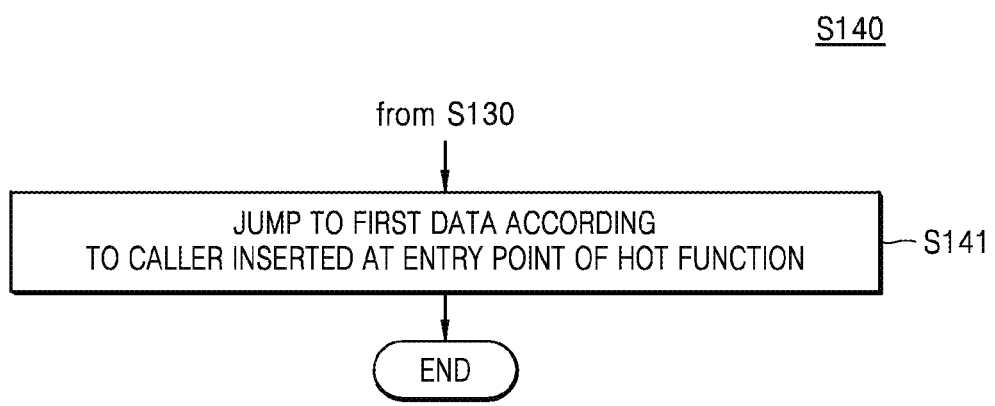
FIG. 7 is a flowchart of an operation method of a processor, according to an example embodiment.

Hereinafter, one or more example embodiments of the inventive concepts will be described in detail with reference to the attached drawings.

FIG. 1 is a block diagram of a computing system according to an example embodiment.

A computing system 1 may process data through an interaction between hardware and software and may provide a processing result to a user. The computing system 1 may provide a physical base on which software may be executed and may derive a result that the user intends by using hardware resources. In an example embodiment, the computing system 1 may execute application software through an operating system (OS) and store an execution result in the memory.

The computing system 1 may include a System on Chip (SoC) 10, a compiler 20, and/or a profiler 30.

The SoC 10 is a semiconductor chip including a hardware module to drive the computing system 1 with one chip. In an example embodiment, applications and embedded software to perform functions of respective hardware modules may be combined and mounted on the SoC 10. An application (or a program) may be application software for a specific purpose. According to an example embodiment, the application may be executed by using at least one function. The application may be built by executing source codes.

In an example embodiment, the SoC 10 may include a computing element (e.g., a central processing unit (CPU), a microprocessor, or the like), a memory device (e.g., Dynamic Random Access Memory (DRAM), flash memory, or the like), a digital signal processing device, or the like, but one or more example embodiments are not limited thereto. The SoC 10 may include various functional elements. Because space, where each element is mounted on a substrate, is reduced by using the SoC 10, a product miniaturization may be possible, and manufacturing costs may decrease compared to a case where different functional elements are separately manufactured.

According to an example embodiment, the SoC 10 may store compile data 210. According to an example embodiment, the compile data 210 may be data, for example, a code, a machine language, and the like, which is compiled in advance to be appropriate for hardware included in the SoC 10 to improve the throughput of the SoC 10. The compile data 210 will be described in detail with reference to FIGS. 2 to 13.

The compiler 20 may receive a source code SRC and convert the source code SRC into an assembly language or a machine language to be processed by a processor. The compiler 20 may translate an application, which is written in a high-level language, into a target program that may be processed by a computer. According to an example embodiment, the compiler 20 may include an assembler. The assembler converts an assembly language into a machine language that a computer directly processes. According to an example embodiment, the compiler 20 may provide the translated/converted language to the profiler 30 or the SoC 10.

The profiler 30 may execute the application and analyze performance of the application. The application may include functions or a unit repetition logic, and the profiler 30 may measure and analyze various computing performances such as a call frequency, an execution time, power consumption, complexity of the functions, unit repetition logic, etc., by using a source code or a binary execution code. For example, for data collection, the profiler 30 may use methods such as hardware interrupt, code measurement, instruction set simulation, operating system hooking, performance counting, etc.

FIG. 1 illustrates that the profiler 30 is separated from the SoC 10 according to an example embodiment. However, the profiler 30 may be included inside the SoC 10, thus analyzing the performance of the application. In an example embodiment, the profiler 30 may provide a performance analysis function of the application through an Application Programming Interface (API) operating on the SoC 10.

According to an example embodiment, the SoC 10 may load the compile data 210 based on a result of analysis performed by the profiler 30 and execute the application.

According to an example embodiment, the SoC 10 may insert a caller referring to the compile data 210 into a source code SRC of the application, and the source code SRC, into which the caller is inserted, may be compiled by the compiler 20 and provided again to the SoC 10. According to an example embodiment, the SoC 10 may process the machine language, in which the source code SRC including the caller is compiled, and thus may improve a processing speed of data by referring to the compile data 210.

FIG. 2 is a block diagram of the SoC 10 according to an example embodiment. The descriptions provided with reference to FIG. 1 will be omitted.

The SoC 10 may include a processor 100, a first memory 200, and/or a second memory 300. The processor 100, the first memory 200, and/or the second memory 300 may communicate with each other via a bus 50.

The processor 100 may process all operations of the SoC 10, more particularly, requests from other components forming the SoC 10, and may control other components. In an example embodiment, the processor 100 may perform a certain task, an instruction, an operation, or the like. In an example embodiment, a configuration of the processor 100 may be determined according to compiling of the compiler.

In an example embodiment, the processor 100 may include processing circuitry such as hardware including logic circuits; a hardware/software combination such as a processor executing software; or a combination thereof. For example, the processing circuitry more specifically may include, but is not limited to, a general-purpose processor, an exclusive processor, an Application Processor (AP), a computation processor (e.g., a central processing unit (CPU), a Graphics Processing Unit (GPU), an AP, or the like), an arithmetic logic unit (ALU), a digital signal processor, a microcomputer, a programmable logic unit, a microprocessor, an exclusive logic circuit (e.g., Field Programmable Gate Array (FPGA), Application Specific Integrated Circuits (ASICs), or the like), etc., but one or more example embodiments are not limited thereto.

According to an example embodiment, the processor 100 may further include an accelerator that is an exclusive circuit for high-speed data computation such as Artificial Intelligence (AI) data computation, and the accelerator may include a GPU, a Neural Processing Unit (NPU), a Data Processing Unit (DPU), and/or the like. According to an example embodiment, the accelerator may be realized as a separate chip that is physically separated from other components of the processor 100.

The processor 100 may include cores 110. The cores 110 may be independent processing units of the processor 100. In an example embodiment, the cores 110 may distribute the data and/or process the same in parallel by executing commands independently stored in a command queue.

The cores 110 may include an array of function units (FUs). The FUs of the cores 110 may correspond to an Arithmetic Logic Unit (ALU), a multiplier, a Load/Store unit, or the like, and input/output paths may be between the FUs. The cores 110 may also include local register files.

The cores 110 may operate in two different modes that are a Very Long Instruction Word (VLIW) mode and a Coarse Grained Array (CGA) mode.

In an example embodiment, in the VLIW mode, the cores 110 may use some FUs included in the cores 110 and may process a general serial operation instead of a loop operation. In an example embodiment, the cores 110 may perform a simple loop operation or a loop operation of which the number of repetitions is small, in the VLIW mode. That is, when the cores 110 operate in the VLIW mode, the cores 110 may execute Instruction Level Parallelism (ILP).

In an example embodiment, in the CGA mode, the cores 110 may use various FUs included in the cores 110 and process the loop operation in parallel. That is, when the cores 110 operate in the CGA mode, the cores 110 may execute the Loop Level Parallelism (LLP).

According to an example embodiment, the processor 100 using two or more cores may be referred to as a multi-core processor. The multi-core processor has a fast processing speed and consumes a small amount of power. In an example embodiment, in the multi-core processor, all cores or all threads as minimum processing units may share one memory.

The first memory 200 may provide stored data to the processor 100. According to an example embodiment, the first memory 200 may be a working memory communicating data with the processor 100 in real time. For example, as volatile memory, the first memory 200 may include DRAM, Static RAM (SRAM), mobile DRAM, Double Data Rate Synchronous Dynamic RAM (DDR SDRAM), Low Power DDR (LPDDR), SDRAM, Graphic DDR (GDDR) SDRAM, Rambus Dynamic RAM (RDRAM), and the like. However, this is merely an example, and the inventive concepts do not exclude that the first memory 200 includes a non-volatile memory.

According to an example embodiment, the first memory 200 may store the compile data 210. The compile data 210 may correspond to a machine language in which any one of functions forming the application is compiled to be improved or optimized for each (or one or more) core 110.

According to an example embodiment, the compile data 210 may be data in which a function, which has a great profile load from among the functions forming the application, is compiled to be appropriate for each (or one or more) core 110 as a result of profiling the application. For example, when a first function is determined as the function having the great profile load, the compile data 210 may include first data, in which the first function is compiled to be appropriate for a first core from among the cores 110, and/or second data, in which the first function is compiled to be appropriate for a second core from among the cores 110.

In an example embodiment, the compile data 210 may be data generated as data stored in the second memory 300 is loaded on the first memory 200. In an example embodiment, the compile data 210 may be stored in the first memory 200 as the application executed on the cores 110 is compiled.

The second memory 300 may be a storage device in which a process result of the processor 100 is permanently stored. In an example embodiment, the second memory 300 is a non-volatile memory and may include Electrically Erasable Programmable Read-Only Memory (EEPROM), flash memory, Phase Change Random Access Memory (PRAM), Resistance Random Access Memory (RRAM), Nano Floating Gate Memory (NFGM), Polymer Random Access Memory (PoRAM), Magnetic Random Access Memory (MRAM), Ferroelectric Random Access Memory (FRAM), or the like. However, one or more example embodiments are not limited thereto, and the inventive concepts do not exclude that the first memory 200 includes a volatile memory.

The second memory 300 may store an application 310. In an example embodiment, the application 310 may be a collection of commands including functions and loops. According to an example embodiment, a host may provide an Application Programming interface (API) to an application programmer, and the application programmer may write a source code in a programming language and build the source code. For example, the application 310 may be built through a combination of functions forming syntax expressed in various programming languages such as C, C++, C #, Objective-C, Java, Javascript, Python, Visual Basic, Visual Basic .NET, PHP, R, SQL, PL/SQL, Perl, Grooovy, Ruby, Go, MATLAB, Swift, Assembly, etc. In the present specification, a function indicates logical operations for implementing semantics indicated by syntax.

In an example embodiment, the application 310 may be stored in the second memory 300 that is an auxiliary memory and may be fetched (loaded) to the first memory 200 that is a main memory, according to a request from the processor 100. According to an example embodiment, the processor 100 may decode the application fetched to the first memory 200 that is the main memory, and may execute an execution code that is a program command. In an example embodiment, the processor 100 may store the data, which has been processed according to the command, again in the first memory 200 that is the main memory or may write back the data in the second memory 300 that is the auxiliary memory.

The bus 50 may relay data communication between the processor 100, the first memory 200, and/or the second memory 300. In an example embodiment, the bus 50 may relay reception/transmission of a control signal, data, and/or an address between the processor 100, the first memory 200, and/or the second memory 300 by using various types of buses such as an address bus, a control bus, a data bus, and the like.

According to an example embodiment, the processor 100 may receive data from the first memory 200 and/or the second memory 300 through a memory interface (not shown) included in the processor 100 and/or may provide the data to the first memory 200 and/or the second memory 300.

FIG. 2 illustrates that the first memory 200 and the second memory 300 are separate configurations, but one or more example embodiments are not limited thereto. For example, the first memory 200 and the second memory 300 may be included in the same hardware, but they may indicate spaces stored in different logic areas.

FIG. 3 is a block diagram of the SoC 10 according to an example embodiment. The descriptions provided with reference to FIGS. 1 and 2 will be omitted.

Referring to FIG. 3, the SoC 10 may include the processor 100 and/or the first memory 200. The SoC 10 may interconnect with the compiler 20 and/or the profiler 30.

The cores 110 may include a big core 111 and/or a little core 113. According to an example embodiment, to effectively improve the throughput, a heterogeneous core, in which the big core 111 and the little core 113 are embodied in one chip, may be used as an example of the multi-core processor. By employing the heterogeneous core, the processor 100 may have excellent performance and/or consume a small amount of power. In the present specification, the heterogeneous core indicates a heterogeneous multi-core.

The big core 111 and/or the little core 113 may use a single Instruction Set Architecture. The cores 110 (that is, the big core 111 and the little core 113) may be produced by different manufacturers, or the cores may be different product groups produced by a same manufacturer. However, the cores 110 may uniformly process the machine language. The cores 110 may have different micro-architectures.

According to an example embodiment, the cores 110 that are heterogeneous may provide different process modes such as a Cluster Migration mode, in which any one of clusters of the big core 111 and/or the little core 113 is selectively activated, an In-Kernel Switcher mode, in which any one of the clusters of the big core 111 and/or the little core 113 is selectively activated, and/or a Heterogeneous Multi Processing mode, in which the clusters of the big core 111 and/or the little core 113 may be used in points in time regardless of the clusters.

The big core 111 has a great throughput, but consumes a lot of power. The little core 113 may consume a small amount of power, but has a low throughput. The configuration of the heterogeneous core may provide high performance and/or low power consumption. In the present specification, for convenience of explanation, the big core 111 and the little core 113 are illustrated, but one or more example embodiments are not limited thereto. For example, the processor 100 may include a first core, a second core, and a third core, and at least one of the first to third cores included in the processor 100 may be a big core, and at least one of the remaining ones may be a little core. For example, the first core and the second core may be big cores, and the third core may be a little core. As another example, the first core may be a big core, the second core may be a little core, and a third core may be a medium-performance and medium-power core. For example, each (or one or more) of the first to third cores may be any one of a big core, a medium-performance and medium-power core, and/or a little core.

The cores 110 may include monitoring units. The cores 110 may provide core information to another device/unit through the monitoring units. The core information may include unique core information such as implementor information, an ID code, and the like. For example, a Cortex™ product group of ARM Holdings™ (ARM) and an Exynos™ product group of SAMSUNG Electronics Co., Ltd™ may be included as the core information. For example, as the Cortex™ product group, Cortex-A™, Cortex-R™, Cortex M™, Cortex X™ and the like may be included. For example, Cortex-A55™, Cortex-A75™, and the like may be included as core information regarding the Cortex™ product group. For example, as the Exynos™ product group, Exynos-M2™, Exynos-M3™, and the like may be included. However, each of the stated product groups is merely an example, and one or more example embodiments are not limited thereto.

The compiler 20 may provide the processor 100 with execution codes EC written in the machine language, and the processor 100 may execute binary codes corresponding to commands, based on the execution codes EC.

According to an example embodiment, the compiler 20 may be executed by the host. For example, when an application programmer writes source codes SRC of a program for data processing by using an API, the compiler 20 executed by the host may generate an executable file, e.g., a data processing code, which may be executed by the processor 100, from the source codes SRC. For example, the data execution code may be a binary code or a binary file.

In an example embodiment, the compiler 20 may receive the source code SRC from the user or from the processor 100. In an example embodiment, the compiler 20 may compile the source code SRC into an assembly code (AC). According to an example embodiment, the compiler 20 may include an assembler and convert the source code SRC into the machine language.

The profiler 30 may be a performance analysis tool for measuring and analyzing the source code SRC and/or a binary execution file forming the application. The profiler 30 may output a statistical summary of an event (e.g., a set of functions) forming an application being monitored, a trace of recorded events, an interaction with a hypervisor (e.g., continuous or periodic monitoring using a display), and the like. According to an example embodiment, the profiler 30 may use various types of profiling methods such as a flat profiler, a call-graph profiler, an input-sensitive profiler, and the like. FIG. 3 illustrates that the profiler 30 is separated from the compiler 20, but the profiler 30 may be included in a debugging mode of the compiler 20. According to an example embodiment, the profiler 30 may perform a dynamic program analysis by measuring the time complexity and space (memory) of an application, use of certain commands, a cycle and a frequency of function calls, usage of commands, a call frequency, and the like. According to an example embodiment, the profiler 30 may use various performance analysis methods including code measurement, instruction set simulation, operating system hooking, and/or performance counting used in the compiler 20.

According to an example embodiment, the profiler 30 may receive the assembly code AC from the compiler 20. The profiler 30 may analyze the assembly codes AC to extract a hot function, which is a function frequently called and/or causing a long execution time from among the functions forming the application, and may provide hot function information HFI to the processor 100. According to an example embodiment, the profiler 30 may directly provide the hot function information HFI to the compiler 20. Here, a function may be one of logical function units forming codes. The function may include at least one logic loop block. The logic loop block may be a collection of commands repeatedly executed while a certain condition is satisfied and/or until a termination condition is satisfied.

In an example embodiment, a function having a great profile load may be a function having a high call frequency or a logic execution time. The function having a great profile load may be referred to as a hot function. However, one or more example embodiments are not limited thereto. For example, functions having great profile load, great time complexity, great space usage, a high frequency of using certain commands, and/or a short call cycle may be selected as hot functions.

The term "function" is used for convenience, but it means a code block performing a certain function and is not limited to a concept of a function in a high-level programming language. For example, it should be understood that a function used in the present specification means not only a function in a high-level programming language but various logical function blocks such as syntax and a logical loop.

According to an example embodiment, the profiler 30 may determine a profile load based on a call frequency of a function. For example, the profiler 30 may determine a hottest function that is the most frequently called from among the functions forming the application in a profile cycle. According to an example embodiment, the profiler 30 may determine the profile load based on an execution time. For example, the profiler 30 may determine a delay function that causes the longest execution time from among the functions forming the application in a profile cycle of the compiler 20.

In an example embodiment, when a call frequency of any one of the functions forming the application is greater than a threshold value, and/or when an execution time of any one of the functions is greater than the threshold value, the function may be referred to as a hot function. According to an example embodiment, the number of hot functions may be at least two. The hot function according to an example embodiment may be a function having a great profile load and/or having a call frequency and/or an execution time that is greater than the threshold value.

According to an example embodiment, the operation of the compiler 20 and/or the profiler 30 may be performed in a host area. In an example embodiment, the host may be realized as a server, an integrated circuit, an SoC, a printed circuit board (PCB), an application processor, a mobile AP, or the like. In an example embodiment, an interface (not shown) relaying between the host and the processor 100 may be Serial ATA (SATA) or Serial Attached SCSI (SAS), but one or more example embodiments are not limited thereto.

According to an example embodiment, the processor 100 may automatically modify the source codes SRC based on hot function information HFI and may provide the modified source codes MSRC. According to an example embodiment, the processor 100 may access a target function corresponding to the hot function among the source codes SRC and may automatically insert a caller referencing a memory at an entry point that is between a header and a body of the target function and is a start point of the body, without intervention from the application programmer. The caller may be used to call values stored in the memory in advance. According to an example embodiment, when the caller is inserted into the source code SRC automatically, the function, syntax, and/or logic loop may jump to refer to the values stored in the memory. According to an example embodiment, when the source code SRC is compiled and executed by the processor 100, data stored in the memory may be referred to in a point in time when a code corresponding to the hot function is processed.

According to an example embodiment, the application programmer may modify the source code SRC based on the hot function information HFI and provide the modified source code MSRC. The application programmer may insert a caller, which refers to the memory, at an entry point of the target function corresponding to the hot function.

The compiler 20 may receive the modified source code MSRC and provide the processor 100 with an execution code EC that is a result of compiling the modified source code MSRC. According to an example embodiment, the modified source code MSRC may be a result formed by inserting a code referring to the compile data 210 into a hot function that is frequently called or causes a long execution time from among the functions forming the source code SRC. In other words, according to an example embodiment, the compiler 20 may generate the execution codes EC by compiling the modified source code MSRC, in which the caller referring to the compile data 210 is inserted at the entry point of the hot function, and may provide the execution codes EC to the cores 110.

The compile data 210 may include first data 211, second data 212, third data 213, and fourth data 214. According to an example embodiment, the hot function may be compiled to be appropriate for each (or one or more) core 110. The compile data 210 may correspond to an assembly code or a machine language improved or optimized for each (or one or more) core 110 and at least one hot function that has a great profile load from among the functions forming the application.

According to an example embodiment, the hot function may be copied a number of times up to the number of cores 110. The copied hot functions may be improved or optimized to be appropriate for the cores 110, respectively. For example, the processor 100 may improve or optimize the hot function for the big core 111. For example, the processor 100 may improve or optimize the hot function for the little core 113. For example, the compiler 20 may compile the hot function from among the source codes SRC and may improve or optimize assembly codes to be appropriate for respective cores 110.

According to an example embodiment, two or more hot functions may be extracted. In this case, all of the hot functions may be improved or optimized for each (or one or more) core 110.

For example, the first data 211 may be compiled data in which a first hot function is improved or optimized for the big core 111. For example, the second data 212 may be compiled data in which the first hot function is improved or optimized for the little core 113. For example, the third data 213 may be compiled data in which a second hot function is improved or optimized for the big core 111. For example, the fourth data 214 may be compiled data in which the second hot function is improved or optimized for the little core 113. For convenience, it is assumed that the number of hot functions is two and the number of cores is two. However, the number of hot functions and the number of cores may each be equal to or greater than two.

Before the production of System on Chip (SoC), each, or at least one, core applied to the heterogeneous core 110 may be predetermined or alternatively, given. Therefore, an application programmer may change the function relationship or loop to match the core specifications and/or performance (e.g., ARM's Coretex™ family, Samsung Electronics' Exynos™ family, etc.) of frequently used functions (e.g., hot function candidates) during application execution, and the data CDAT may be the result of the change.

According to an example embodiment, a scheduler of the OS may select a core for executing an application from among the cores. For example, while the big core 111 is occupied, the scheduler may select the little core 113 to allow the little core 113 to execute the application. For example, while the little core 113 is occupied, the scheduler may select the big core 111 to allow the big core 111 to execute the application.

According to an example embodiment, the processor 100 may refer to the compile data 210 stored in advance based on the hot function information HFI and the core information CI regarding the cores CI and may load, from the first memory 200, the data CDAT corresponding to the execution core from among the compile data 210 that is compiled to be appropriate for the hot function and a core scheduled to execute the application.

According to an example embodiment, the processor 100 may access monitoring units of the cores 110 and identify information of each (or one or more) core 110 that is stored in the monitoring unit. Also, based on the hot function information HFI, the processor 100 may load the data CDAT corresponding to the execution core from the compile data 210.

According to an example embodiment, the core information CI may include unique core information such as an implementor of each (or one or more) core and an ID code provided by each (or one or more) implementor, but one or more example embodiments are not limited thereto.

According to an example embodiment, the processor 100 may access the monitoring units of the cores 110 and obtain the core information CI including implementor information and/or ID codes. According to an example embodiment, the cores 110 may be heterogeneous cores, and the heterogeneous cores may store, in the monitoring units thereof, the core information CI including different pieces of implementor information and/or different ID codes.

According to an example embodiment, the processor 100 may sequentially execute the execution codes EC and may jump to data, which corresponds to a core for executing an application from among the compile data 210, in response to the processing of the code, which corresponds to the caller referring to the compile data 210 from among the execution codes EC.

According to an example embodiment, when sequentially executing the execution codes EC, the processor 100 may load the data CDAT included in the compile data 210 and corresponding to the execution core, which is improved or optimized for the core information CI of the core for executing the application, in response to the processing of the code corresponding to the hot function.

According to an operation method of an SoC, in an environment in which a single instruction set architecture is used, a program improved or optimized for each (or one or more) core may be executed even though heterogeneous cores having different features (e.g., implementors, ID codes, etc.) are used, and thus, a processing speed may be improved. Also, because a core is improved or optimized only for a function frequently called, an increase in code sizes because of code duplication and waste of power consumed to process increased codes may be reduced or restricted.

Because the SoC may execute an application independently from the scheduler of the OS, limited processing resources may be effectively distributed.

FIG. 4 is a flowchart of an operation method of the processor 100, according to an example embodiment. The flowchart will be described with reference to FIGS. 3 and 4. The flowchart of FIG. 4 may correspond to operations of the processor 100 of FIG. 3.

In operation S110, an execution core for executing an application may be selected by a scheduler. According to an example embodiment, the scheduler forming the operating system OS may select an execution core for executing the application from among the cores (110 of FIG. 3), and the execution code of the application may be processed in the execution core.

In operation S120, the processor 100 may load data (e.g., the first data 211) corresponding to the hot function and the execution core from among the compile data 210. According to an example embodiment, the processor 100 may sequentially process the execution codes EC, and when a code corresponding to the hot function is found while the execution codes are processed (that is, during a run time), the processor 100 may access the compile data 210 based on the core information CI and may load the data CDAT appropriate for the execution core corresponding to the core information of the execution core.

In operation S130, the processor 100 may process the execution code of the application, based on the first data 211. According to an example embodiment, the processor 100 may process the execution code EC of the application, based on the data CDAT appropriate for the execution core corresponding to a loading result of the first data 211. According to an example embodiment, when processing the execution codes corresponding to the hot function, the processor 100 may load the data, which is stored in advance and compiled, without processing all of the execution codes, and thus, the execution time may decrease. Also, the data CDAT, which is appropriate for the execution core, is improved or optimized for the execution core that currently executes the application. Thus, a computation time and power consumption may decrease, compared to when an execution code that is not improved or optimized for a core is used.

In operation S140, the processor 100 may evaluate execution performance of the application. According to an example embodiment, the processor 100 may evaluate the application executed by the execution core, according to various application performance criteria such as a process time, power consumption, call frequency, and the like. According to an example embodiment, the processor 100 may determine which one of the cores 110 has great application execution performance according to the performance evaluation of the application, and may enable the determined core to mainly process the application. In an example embodiment, the compiler 20 may stop compiling a hot function of which a performance improvement rate is not great, delete inserted compile data, and/or exclude the compile data from call targets of the caller, thus improving or optimizing the execution of the application.

FIG. 5 is a flowchart of an operation method of the processor 100, according to an example embodiment. Operation S120 of FIG. 4 will be specified with reference to FIG. 5. FIGS. 3 and 4 will be referred to as well.

In operation S121 after the execution core is selected in operation S110, the execution code (EC of FIG. 3) may start being processed. According to an example embodiment, the execution core of the cores (110 of FIG. 3) may sequentially process the execution codes EC.

In operation S123, as a first code corresponding to the hot function from among the execution codes EC is processed, the first data may be loaded. According to an example embodiment, as the machine language (or the assembly code) corresponding to the hot function from among the execution codes EC is processed by the execution core, the execution core may not directly process the hot function and may fetch (or load) the data (CDAT of FIG. 3) corresponding to the execution core from the machine language (or the assembly code) stored in the compile data (210 of FIG. 3). Then, operation S130 is performed.

FIG. 6 is a flowchart of an operation method of the processor 100, according to an example embodiment. Operation S120 of FIG. 4 will be specified with reference to FIG. 6. FIGS. 3 and 4 will be referred to as well.

In operation S125 after the selection of the execution core in operation S110, the processor 100 may obtain core-related information by accessing a monitoring unit of the execution core. According to an example embodiment, the processor 100 may process a current execution code or may obtain core-related information, for example, an implementor, an ID code, or the like, which is stored in a monitoring unit of an execution unit to be processed.

In operation S127, the processor 100 may load the first data 211 based on the core information. According to an example embodiment, the processor 100 may send a request for the first data DAT1 211 corresponding to core information CI that is currently obtained from among the compile data (210 of FIG. 3) stored in the memory (200 of FIG. 3) and may receive the data CDAT corresponding to the execution core currently operating according to a load result.

FIG. 7 is a flowchart of an operation method of the processor 100, according to an example embodiment.

In operation S141 after the execution code EC of the application is processed based on the first data DAT1 according to operation S130, the processor 100 may jump to the first data 211 according to a caller inserted at an entry point of the hot function. According to an example embodiment, the processor 100 may process an execution code corresponding to a code in which a caller is inserted at an entry point from among the codes of the hot function. The entry point may be an instruction of a code area corresponding to a body and may be between a head and a body. According to an example embodiment, the processor 100 may jump to the first data 211 as a code corresponding to the caller is processed and may load compiled data instead of directly processing the hot function, thereby reducing an execution time and power consumption.

Figure 8:
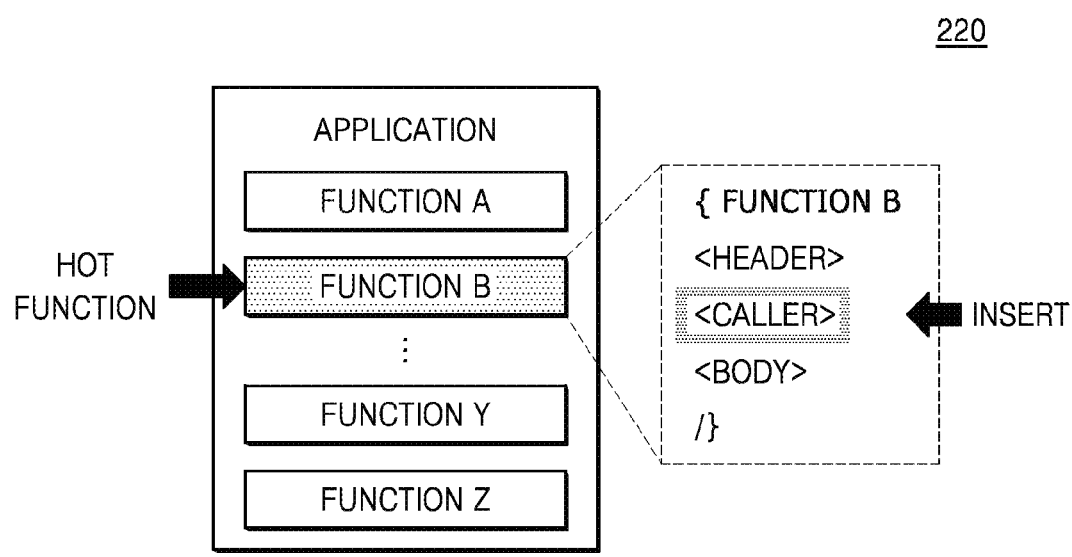
FIG. 8 is a conceptual view illustrating functions forming an application and source codes forming a function, according to an example embodiment.

FIG. 8 is a conceptual view illustrating functions forming an application and source codes forming the functions, according to an example embodiment. A concept of an entry point will be described with reference to FIG. 8. FIG. 3 will be referred to as well.

Referring to FIG. 8, the application includes functions. For example, the application includes a function A, a function B, a function Y, a function Z, and the like. As described above, the functions stated in the present specification indicate functions in a high-level programming language as well as logical function blocks such as a syntax and/or a logical loop.

According to an example embodiment, the profiler (30 of FIG. 3) may determine the function B as the hot function. According to an example embodiment, the hot function may be determined according to criteria such as a call frequency, an execution duration, or the like.

According to an example embodiment, a source code of the function B may include a header and a body. The source code may be written in a high-level programming language by an application programmer. The caller may be inserted at the entry point that is between the header and the body of the function B or is an instruction of the body. The caller according to an example embodiment may refer to a value stored in a memory when a corresponding code is processed. According to an example embodiment, the caller may use compile data, which is stored in advance, instead of directly processing a body of a hot function, by calling data (e.g., the first to fourth data 211 to 214 stored in the compile data 220) stored in a different logical location for each (or one or more) core information of the cores (e.g., the cores 110 of FIG. 3) included in the processor (e.g. the processor 100 of FIG. 3).

Figure 9:
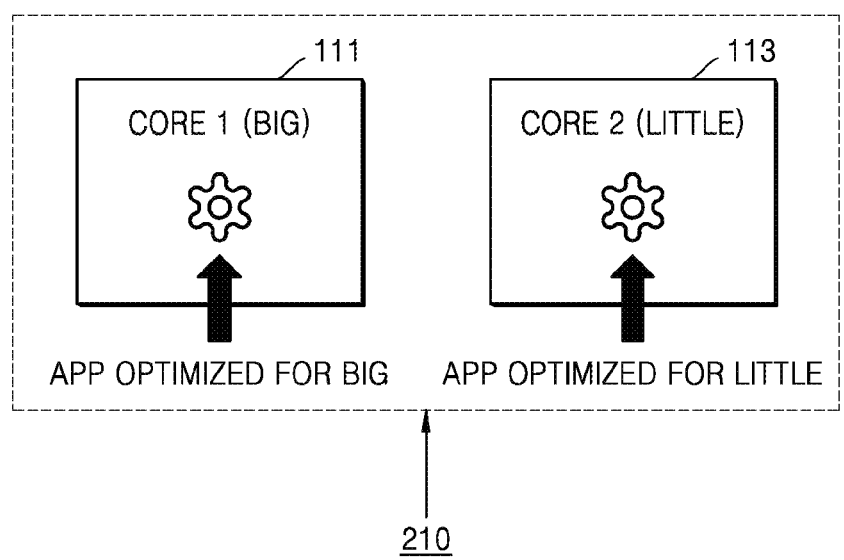
FIG. 9 is a conceptual view of a heterogeneous core for executing an application, according to an example embodiment.

FIG. 9 is a conceptual view of a heterogeneous core for executing an application, according to an example embodiment. FIG. 3 is referred to as well.

Referring to FIG. 9, the cores 110 may include the big core 111 that is the heterogeneous core and the little core 113. For convenience of explanation, two heterogeneous cores are illustrated, but there may be three or more heterogeneous cores (e.g., a big core, a medium-performance and medium-power core, and a little core).

According to an example embodiment, as the big core 111 is determined as the execution core by the scheduler, the big core 111 may sequentially process the execution codes (EC of FIG. 3). The big core 111 may process the code (e.g., the machine language) corresponding to the hot function from among the execution codes EC and may execute the code corresponding to the caller inserted at the entry point of the hot function. According to an example embodiment, the processor 110 may jump to refer to a memory value because of the caller and may refer to the first data 211 corresponding to the core information CI corresponding to the big core 111, from the compile data 210. According to an example embodiment, the processor 100 may execute an application, which is improved or optimized for the big core 111, by fetching (loading) the data CDAT appropriate for the big core 111.

According to an example embodiment, as the little core 113 is determined as the execution core by the scheduler, the little core 113 may sequentially process the execution codes EC. The little core 113 may execute the code corresponding to the caller inserted at the entry point of the hot function. According to an example embodiment, the processor 110 may jump to refer to the memory value because of the caller and may refer to the first data 211 corresponding to the core information CI corresponding to the big core 111, from the compile data 210. According to an example embodiment, the processor 100 may execute the application, which is improved or optimized for the little core 113, by fetching (loading) the data CDAT appropriate for the little core 113.

According to an example embodiment, the execution code EC processed by the big core 111, which is determined as the execution core, may include two hot functions. According to an example embodiment, the processor 100 may refer to the first data 211 and the third data 213 corresponding to the core information CI corresponding to the big core 111 and may execute the application improved or optimized for the big core 111 by fetching (loading) the data CDAT appropriate for the big core 111.

According to an example embodiment, the execution codes EC processed by the little core 113, which is determined as the execution core, may include two hot functions. According to an example embodiment, the processor 100 may refer to the second data 212 and the fourth data 214 corresponding to the core information CI corresponding to the little core 113 and may execute the application improved or optimized for the little core 113 by fetching (loading) the data CDAT appropriate for the little core 113.

Figure 10:
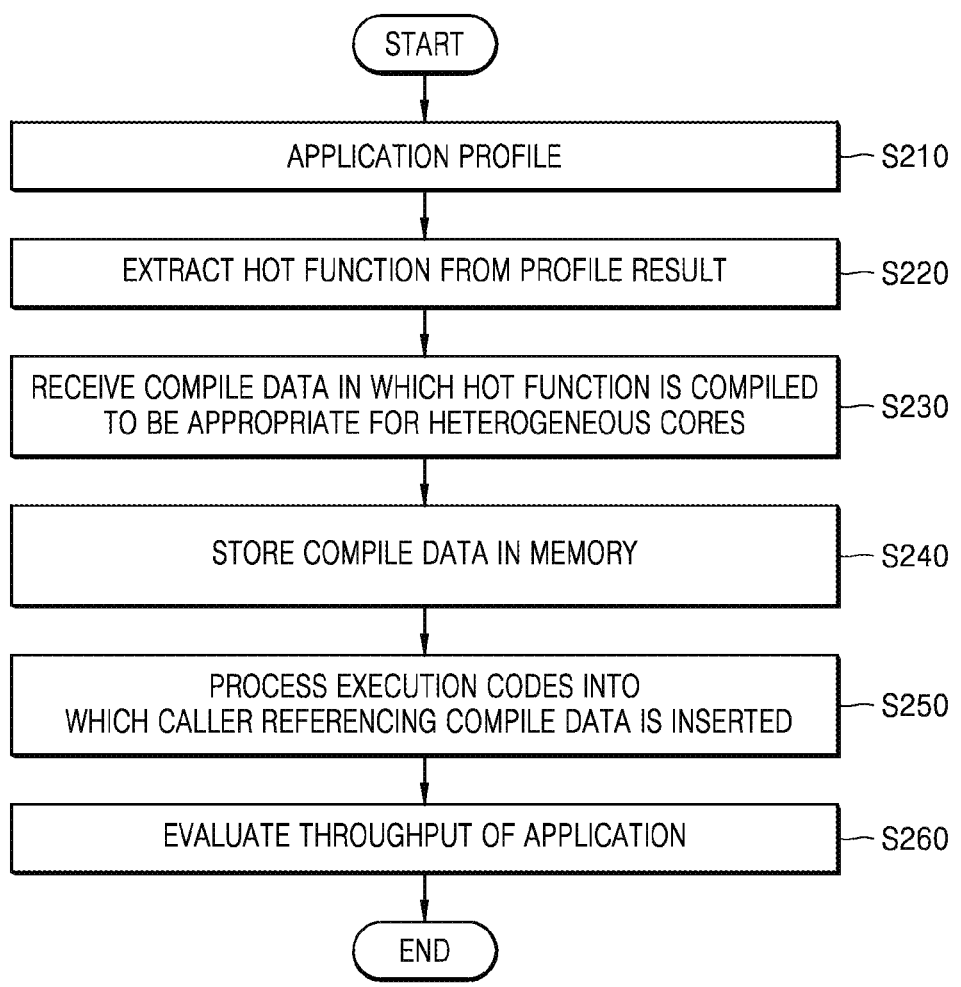
FIG. 10 is a flowchart of an operation method of a system on chip, according to an example embodiment.

FIG. 10 is a flowchart of an operation method of the SoC 10, according to an example embodiment. FIG. 3 is referred to as well.

In operation S210, an application may be profiled. According to an example embodiment, the profiler (30 of FIG. 3) may evaluate performance of the application that is built. For example, the profiler 30 may evaluate the performance of the application, based on a call frequency and/or a processing speed (or an execution duration) of a function.

In operation S220, the hot function may be extracted from a profiling result. According to an example embodiment, the hot function may be a function and/or a logical loop block forming the application and may be a function having a high call frequency and/or a long execution duration. According to an example embodiment, the profiler (30 of FIG. 3) may provide the processor (100 of FIG. 3) or the SoC 10 with information regarding the hot function as an analysis result of the application.

According to an example embodiment, the processor 100 may check the extracted hot function. According to an example embodiment, the processor 100 may retrieve a logical loop and/or a function corresponding to the hot function from the source codes (SRC of FIG. 3) of the application and may insert, at the entry point of the hot function, the caller that refers to the data corresponding to the execution core from among the compile data 210 stored in the memory (200 of FIG. 3). The insertion of the call code may be performed by the application programmer. According to an example embodiment, the application programmer may check an output hot function. According to an example embodiment, the application programmer may retrieve a logical loop or a function corresponding to the hot function from the source code (SRC of FIG. 3) of the application and may insert, at the entry point of the hot function, the caller that refers to the data corresponding to the execution core from among the compile data 210 stored in the memory (200 of FIG. 3).

According to an example embodiment, the compiler (20 of FIG. 3) may receive a modified source code MSRC formed as the caller is inserted into the source code SRC, and may compile the modified source code MSRC. For example, the compiler 20 may translate the modified source code MSRC, which may be written in the high-level programming language, into the machine language. As a result of the compiling, the compile data may be generated. The compiler 20 may provide the compile data to the processor 100.

In operation S230, the processor 100 may receive the compile data in which the hot function is compiled to be appropriate for the heterogeneous core.

In operation S240, the compile data may be stored in the memory. According to an example embodiment, the processor 100 may store the compile data in the memory (200 of FIG. 3). For example, the compile data 210 may include the first data 211, the second data 212, the third data 213, and the fourth data 214. For example, the first data 211 may be compiled data in which a first hot function is improved or optimized for the big core 111. For example, the second data 212 may be compiled data in which the first hot function is improved or optimized for the little core 113. For example, the third data 213 may be compiled data in which a second hot function is improved or optimized for the big core 111. For example, the fourth data 214 may be compiled data in which the second hot function is improved or optimized for the little core 113.

In operation S250, the execution code (EC of FIG. 3), in which the caller referring to the compile data is inserted, may be processed. According to an example embodiment, any one (e.g., the big core 111) of the cores 110, which is selected to execute the application, may sequentially process the execution codes EC. The execution code EC according to an example embodiment may be a binary code (e.g., the machine language) formed by compiling the modified source code MSRC.

In operation S260, the performance of the application may be evaluated. A method of evaluating the performance of the application is similar to the evaluation method described with reference to operation S140 of FIG. 4. Thus, repeated descriptions will be omitted.

Figure 11:
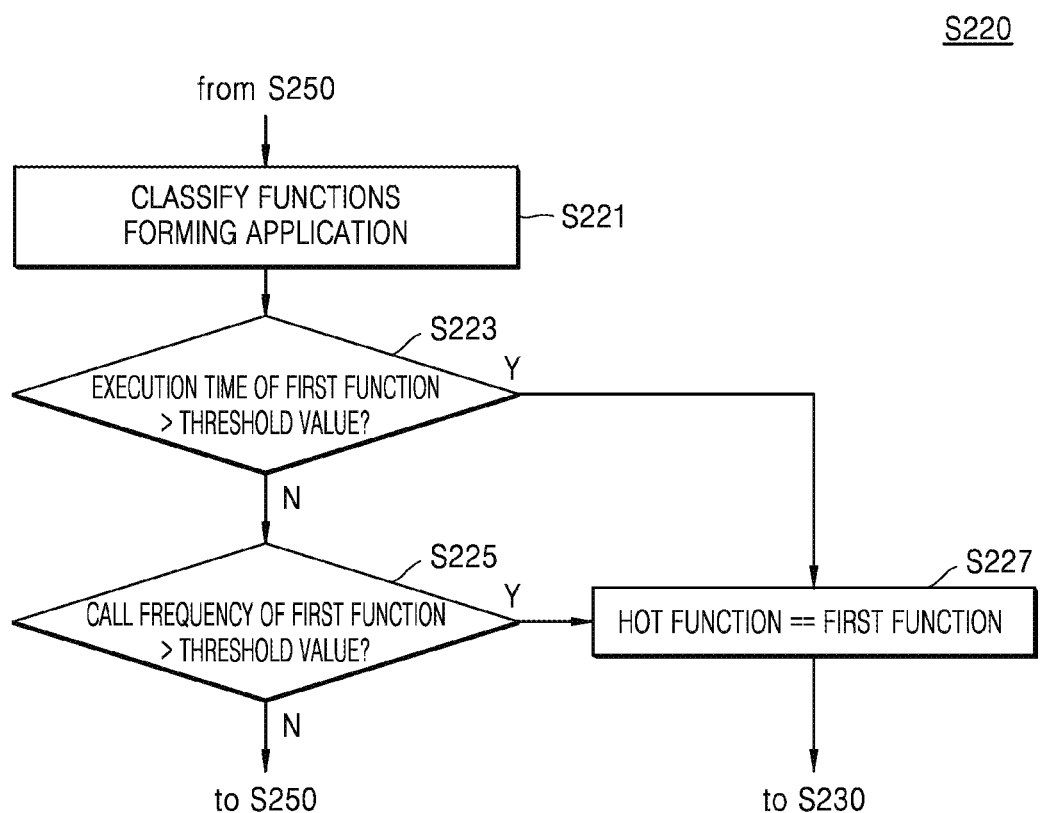
FIG. 11 is a flowchart of an operation method of a system on chip, according to an example embodiment.

FIG. 11 is a flowchart of an operation method of the SoC 10, according to an example embodiment. Operation S220 of FIG. 10 will be specified with reference to FIG. 11. FIG. 3 is referenced as well.

Referring to FIG. 11, in operation S221 after the application is profiled according to operation S210, the profiler (30 of FIG. 3) may classify the functions forming the application. According to an example embodiment, as a result of profiling the application, the functions may be classified according to various criteria such as call frequencies, call cycles, execution durations of the functions, and the like.

In operation S223, it may be determined that a time, which is taken to execute the first function from among the functions, is greater than a threshold value. According to an example embodiment, a function, of which an execution duration is greater than the threshold value, may be extracted from all functions classified according to various criteria. When an execution duration of the first function from among the functions is not greater than the threshold value (N), operation S225 may be performed.

In operation S225, a determination as to whether a call frequency of the first function is greater than the threshold value may be made. According to an example embodiment, a function, of which a call frequency is greater than the threshold value, may be extracted from all (or one or more) functions classified according to various criteria. When the call frequency of the first function is not greater than the threshold value (N), operation S250 may be performed.

When the execution duration of the first function is greater than the threshold value (Y) in operation S223, and/or when the call frequency of the first function is greater than the threshold value (Y) in operation S225, the first function may be determined as the hot function in operation S227. After operation S227 is performed, operation S230 may be performed.

FIG. 12 illustrates an example of a pseudo code inserted into a function forming an application, according to an example embodiment.

The pseudo code of FIG. 12 may include a concept corresponding to the caller. The pseudo code corresponding to the caller may be written to call a function that is stored in advance according to an implementor and/or an ID code.

According to the pseudo code, the implementor and/or the ID code may be obtained from a register pmu_resister of a monitoring unit of a core.

For example, ARM™ and SAMSUNG™ may be the implementor of the core. ARM™ may have Cortex-A55™ and Cortex-A75™ as ID codes, and SAMSUNG™ may have exynos-m2™ and exynos-m3™ as ID codes. However, one or more example embodiments are not limited thereto.

FIG. 13 illustrates an example of a pseudo code regarding compile data stored in a memory, according to an example embodiment.

The pseudo code of FIG. 13 may include a concept corresponding to the compile data. The compile data (210 of FIG. 3) according to an example embodiment may provide data stored in advance according to the ID code.

Figure 14:
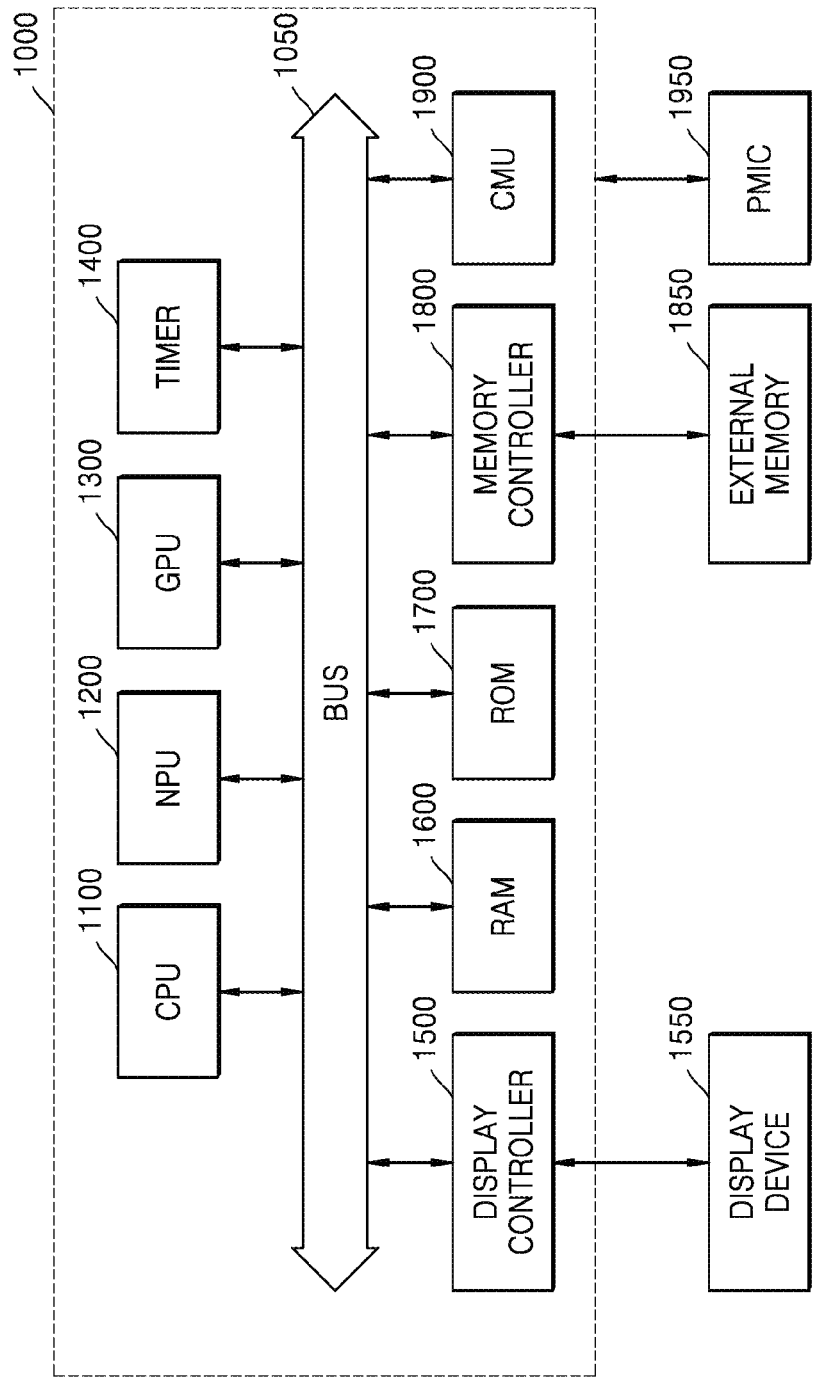
FIG. 14 is a block diagram of an electronic device including a system on chip, according to an example embodiment.

FIG. 14 is a block diagram of an electronic device 2 including a SoC 1000, according to an example embodiment. The SoC 10 of FIG. 3 may be applied to the SoC 1000 of FIG. 14. The SoC 1000 of FIG. 14 may support the computing system 1 of FIG. 1.

Referring to FIG. 14, the electronic device 2 may be realized as a handheld device such as a mobile phone, a smart phone, a tablet personal computer (PC), a Personal Digital Assistant (PDA), an enterprise digital assistant (EDA), a digital still camera, a digital video camera, a Portable Multimedia Player (PMP), a personal navigation device or portable navigation device (PND), a handheld game console, an e-book reader, or the like.

The electronic device 2 may include the SoC 1000, an external memory 1850, a display device 1550, and/or a power management IC (PMIC) 1950.

The SoC 1000 may include a CPU 1100, an NPU 1200, a GPU 1300, a timer 1400, a display controller 1500, RAM 1600, Read Only Memory (ROM) 1700, a memory controller 1800, a Clock Management Unit (CMU) 1900, and/or a bus 1050. The SoC 1000 may further include other components in addition to the components shown in the drawing. For example, the electronic device 2 may further include the display device 1550, the external memory 1850, and/or the PMIC 1950. In the example embodiment of FIG. 14, the PMIC 1950 may be embodied outside the SoC 1000, but in another example embodiment, the SoC 1000 may include a power management unit (PMU) capable of performing a function of the PMIC 1950.

The CPU 1100 may be referred to as a processor and may process or execute programs and/or data stored in the external memory 1850. For example, the CPU 1100 may process or execute the programs and/or the data in response to an operation clock signal output from the CMU 1900.

The CPU 1100 may be realized as a multi-core processor. The multi-core processor may be one computing component having two or more independent processors (referred to as cores), and each (or one or more) processor may read and execute program instructions. Programs and/or data stored in the ROM 1700, the RAM 1600, and/or the external memory 1850 may be loaded on a memory (not shown) of the CPU 1100.

The NPU 1200 may effectively process a large number of computations by using an artificial neural network. The NPU 1200 may perform deep learning by supporting spontaneous matrix operations.

The GPU 1300 may convert the data, which is read by the memory controller by the memory controller 1800 from the external memory 1850, into a signal appropriate for the display device 1550.

The timer 1400 may output a count value indicating a time, according to an operation clock signal output from the CMU 1900.

The display device 1550 may display image signals output from the display controller 1500. For example, the display device 1550 may be realized as a Liquid Crystal Display (LCD), a Light Emitting Diode (LED) display, an organic OLED (OLED) display, an active-matrix OLED (AMOLED) display, a flexibly display, or the like. The display controller 1500 may control the operation of the display device 1550.

The RAM 1600 may temporarily store programs, data, and/or instructions. For example, the programs and/or data stored in the memory may be temporarily stored in the RAM 1600, according to the control of the CPU 1100 and/or a booting code stored in the ROM 1700. The RAM 1600 may be DRAM and/or SRAM.

The ROM 1700 may store permanent programs and/or data. The ROM 1700 may be erasable Programmable Read-Only Memory (EPROM) and/or Electrically Erasable EEPROM.

The memory controller 1800 may interface with the external memory 1820. The memory controller 1800 may control all (or one or more) operations of the external memory 1820 and data exchange between a host and the external memory 1850. For example, the memory controller 1800 may write the data on the external memory 1850 and/or read the data therefrom, according to a request from the host. Here, the host may be a master device such as the CPU 1100, the GPU 1300, and/or the display controller 1500.

The external memory 1850 may be a storage medium for storing data and may store an OS, various programs, and/or various types of data. The external memory 1850 may be, for example, the DRAM, but one or more example embodiments are not limited thereto. For example, the external memory 1850 may be a non-volatile memory device (e.g., a flash memory device, a PRAM device, a MRAM device, a RRAM device, a FeRAM device, etc.). In another example embodiment, the external memory 1850 may be a memory included inside the SoC 1000. Also, the external memory 1850 may be flash memory, an embedded multimedia card (eMMC), universal flash storage (UFS), or the like.

The CMU 1900 may generate an operation clock signal. The CMU 1900 may include a clock signal generator such as a phase locked loop (PLL), a delayed locked loop (DLL), and/or a crystal oscillator.

The operation clock signal may be provided to the GPU 1300. The operation clock signal may be provided to other components (e.g., the CPU 1100, the memory controller 1800, etc.) The CMU 1900 may change a frequency of the operation clock signal.

The CPU 1100, the NPU 1200, the GPU 1300, the timer 1400, the display controller 1500, the RAM 1600, the ROM 1700, the memory controller 1800, and/or the CMU 1900 may communicate with each other via the bus 1050.

Figure 15:
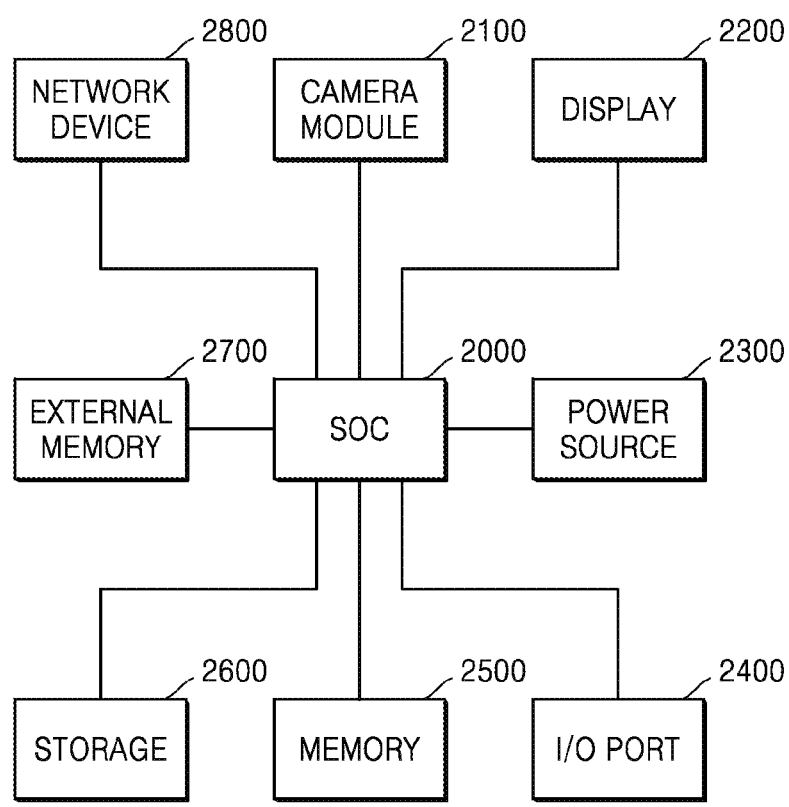
FIG. 15 is a block diagram of an electronic device including a system on chip, according to an example embodiment.

FIG. 15 is a block diagram of an electronic device 3 including an SoC, according to an example embodiment.

The SoC 10 of FIG. 3 may be applied to an SoC 2000 of FIG. 15. The SoC 2000 of FIG. 15 may support the computing system 1 of FIG. 1. The SoC 2000 of FIG. 15 may correspond to the SoC 10 of FIG. 3. The SoC 2000 may control the operation of at least one of components.

Referring to FIG. 15, the electronic device 3 may be realized as a PC, a data server, a portable electronic device, or the like.

The portable electronic device may be realized as a laptop computer, a mobile phone, a smart phone, a tablet PC, a PDA, an EDA, a digital still camera, a digital video camera, a PMP, a PND, a handheld game console, an e-book reader, or the like.

The electronic device 3 may include the SoC 2000, a display 2200, a power source 2300, an input/output (I/O) port 2400, a memory 2500, a storage 2600, an external memory 2700, and/or a network device 2800. According to an example embodiment, the electronic device 3 may further include a camera module 2100.

The camera module 2100 may convert an optical image into an electrical image. Therefore, the electrical image output from the camera module 2100 may be stored in the storage 2600, the memory 2500, and/or the external memory 2700. Also, the electrical image output from the camera module 2100 may be displayed via the display 2200.

The display 2200 may display the data output from the storage 2600, the memory 2500, the I/O port 2400, the external memory 2700, and/or the network device 2800. The display 2200 may be the display device 1550 of FIG. 14.

The power source 2300 may supply an operation voltage to at least one component. The power source 2300 may be controlled by the PMIC 1950 of FIG. 14.

The I/O port 2400 may transmit data to the electronic device 3 or the data, which is output from the electronic device 3, to an external device. For example, the I/O port 2400 may be a port for accessing a pointing device such as a computer mouse, a port for accessing a printer, and/or a port for accessing a USB driver.

The memory 2500 may be realized as volatile memory 2500 and/or non-volatile memory 2500 and may correspond to the external memory 1850 of FIG. 14. According to an example embodiment, a controller of the memory 2500 for controlling a data access operation performed on the memory 2500, for example, a read operation, a write operation (or a program operation), and/or an erase operation, may be integrated and/or embedded in the SoC 2000. According to another example embodiment, the controller of the memory 2500 may be between the SoC 2000 and the memory 2500.

The storage 2600 may be a hard disk drive and/or a solid state drive (SSD).

The external memory 2700 may be realized as a Secure Digital (SD) card and/or a multimedia card (MMC). According to an example embodiment, the external memory 2700 may be a Subscriber Identification Module (SIM) card, a Universal Subscriber Identity Module (USIM) card, or the like.

The network device 2800 may be a device for connecting the electronic device 3 to a wired network and/or a wireless network.

While the inventive concepts have been particularly shown and described with reference to example embodiments thereof, it will be understood that various changes in form and details may be made therein without departing from the spirit and scope of the following claims.

What is claimed is:

1. An operation method of a processor comprising a plurality of heterogeneous cores, the operation method comprising:
   loading, from a memory, first data corresponding to core information of an execution core of the plurality of heterogenous cores during runtime of the execution core, wherein the first data is included in compile data of an application, the compile data including a first function compiled for each heterogeneous core of the plurality of heterogeneous cores, the first function being a function from among a plurality of functions of the application that is at least one of frequently called; and
   processing, by the execution core, execution codes for executing the application, based on the first data.

2. The operation method of claim 1, wherein the loading the first data comprises:
   processing, by the execution core, the execution codes; and
   loading the first data in accordance with processing a first code corresponding to the first function from among the execution codes.

3. The operation method of claim 1, wherein the loading the first data comprises:
   obtaining the core information; and
   loading the first data based on the core information.

4. The operation method of claim 1, wherein the compile data is data compiled based on the core information and the first function, respectively.

5. The operation method of claim 1, wherein the processing the execution codes comprises:
   jumping, by the execution core, to the first data according to a caller at an entry point of the first function.

6. The operation method of claim 1, further comprising: determining the first function according to a result of profiling the application.

7. The operation method of claim 1, further comprising:
   evaluating an execution performance of the application of the plurality of heterogeneous cores,
   wherein the execution performance includes a process time, power consumption, and a call frequency.

8. The operation method of claim 1, wherein respective heterogeneous cores of the plurality of heterogeneous cores comprise different micro-architecture structures.

9. The operation method of claim 1, wherein the core information comprises at least one of an implementor or an ID code of each of the plurality of heterogeneous cores.

10. The operation method of claim 1, wherein the plurality of heterogeneous cores comprises a single instruction set architecture (ISA).

11. The operation method of claim 1, wherein the processor includes a scheduler, and the application is processed independently of control of the scheduler.

12. An operation method of a System on Chip (SoC) comprising a memory and a processor comprising a plurality of heterogeneous cores and configured to process an execution code executing an application, the operation method comprising:
   profiling the execution code;
   extracting a first function that is frequently called based on the profiling;
   receiving compile data including the first function compiled based on each heterogeneous core of the plurality of heterogeneous cores, respectively;
   storing the compile data in the memory; and
   executing the application by processing a modified execution code including a caller referring to each heterogeneous core in the compile data.

13. The operation method of claim 12, further comprising:
   extracting a second function having a call frequency greater than a first threshold value according to a result of the profiling the execution code.

14. The operation method of claim 12, wherein the executing the application comprises:
   obtaining core information of an execution core from among the plurality of heterogeneous cores; and
   loading first data corresponding to the core information, from among the compile data.

15. The operation method of claim 14, wherein the core information comprises at least one of an implementor or an ID code of each heterogeneous core of the plurality of heterogeneous cores.

16. The operation method of claim 12, wherein the caller is configured to
   be inserted at an entry point of the first function, and
   refer to first data corresponding to the first function, from among the compile data.

17. The operation method of claim 12, wherein the executing the application comprises:
   jumping to first data corresponding to the first function, from among the compile data, in response to a code corresponding to the caller being processed.

18. A System On Chip (SoC) in which an application is executed on a plurality of heterogeneous cores, the SoC comprising:
   a processor including the plurality of heterogeneous cores; and
   a memory configured to store
      a plurality of functions forming the application, and
      compile data based on each heterogeneous core of the plurality of heterogeneous cores,
   wherein the processor is configured to
   load, from the compile data, first data corresponding to a first function from among the plurality of functions based on core information of the plurality of heterogeneous cores, the first function having a profile load greater than a threshold value according to a profiling result.

19. The SoC of claim 18, wherein the profile load comprises a call frequency of any one of the plurality of functions.

20. The SoC of claim 18, wherein the first function includes a caller referencing the compile data at an entry point.

* * * * *